United States Patent Office 3,240,775
Patented Mar. 15, 1966

3,240,775
PREPARATION OF α-L-FUCOSIDES AND L-FUCOSE FROM FUCOIDAN
Richard G. Schweiger, San Diego, Calif., assignor to Kelco Company, San Diego, Calif., a corporation of Delaware
No Drawing. Filed July 30, 1962, Ser. No. 213,155
10 Claims. (Cl. 260—209)

This invention relates to a novel procedure for obtaining alkyl α-L-fucosides and L-fucose from fucoidan. An example of such a fucoside is methyl α-L-fucoside.

It is known to obtain L-fucose by hydrolysis of fucoidan with mineral acid such as sulfuric or hydrochloric acids. In order to obtain L-fucose in its crystalline form it usually had to be purified, for example, by forming the phenyl hydrazone and decomposing it with benzaldehyde. One recently proposed method produces crystalline L-fucose without the additional purification step. However, the starting material has to be relatively pure and the method itself is elaborate.

It is an object of this invention to provide a new method of degrading fucoidan to its monomer, involving alcoholysis.

It is a further object to obtain simple derivatives of L-fucose, namely, alkyl α-L-fucosides as end product, and from which, as a further feature, L-fucose may be obtained as a by-product in smaller quantities.

A further object is the preparation of L-fucose as an only product if alkyl α-L-fucoside is not desired.

A still further and specific object of my invention is to produce methyl α-L-fucoside; ethyl α-L-fucoside; isopropyl α-L-fucoside; butyl α-L-fucoside, amyl α-L-fucoside; and similar alkyl α-L-fucosides including the isomers of the aforementioned alkyl groups.

Other objects of the invention will become apparent during the following description and by the claims.

As is known, fucoidan is a water soluble polysaccharide which occurs in brown algae in varying amounts depending on the species of algae and, to a lesser extent, on location and season. Fucoidan is a polysaccharide that is composed mainly of L-fucose units which are sulfated in the 4-position and connected through $\alpha(1\rightarrow 2)$ linkages.

Fucoidan is readily obtained from *Macrocystis pyrifera* (the common brown kelp) harvested off the coast of Southern California. It may be precipitated with isopropyl alcohol from a water extract of the seaweed followed by a soxhlet extraction with aqueous methanol.

In accordance with my invention I have found that if fucoidan is treated at elevated temperature with an alkyl alcohol such as methyl alcohol and HCl the polysaccharide is completely depolymerized and the sulfate groups are removed quantitatively. Under most favorable conditions the alkyl α-L-fucoside can be isolated in a yield of about 10–11% of the weight of the starting material which is 40–50% of the total amount of L-fucose. The starting material does not need any purification and is sufficiently pure when precipitated from kelp slime with isopropyl alcohol followed by extraction with 90% methanol. The fucoidan thus obtained contains about 22–24% of the weight of the starting material as L-fucose. However, a variation of the total L-fucose content does not influence the reaction esenstially.

In the description to follow of alkyl α-L-fucosides made in accordance with my invention I make reference to methyl as the alkyl group and methanol as an example of an alkyl alcohol. It will be understood, of course, that other alcohols such as ethyl, isopropyl, butyl, amyl, and cyclic alcohols such as cyclohexyl alcohol may be used. The other reaction conditions are essentially the same as described for the reaction with methyl alcohol and hydrogen chloride (methanolic hydrogen chloride).

The various alkyl alcohols produce the corresponding alkyl α-L-fucosides. Some of the α-L-fucosides so produced are in crystalline form and others are in colorless to brown syrup form.

The conditions at which methyl α-L-fucoside can be isolated in optimum yields are about 50 g. of hydrogen chloride gas and 100–200 g. of fucoidan per liter of methanol. The most favorable temperature is around 50–80° and the reaction time 15–25 hours. If the reaction conditions are considerably changed the yield of crystalline methyl α-L-fucoside usually decreases. If the amount of fucoidan relative to the methanol is decreased while all other conditions and concentrations are maintained the yield of the end product actually is better. However, too high a dilution is impractical which sets a limit with respect to dilution.

After the reaction the mixture is filtered and the hydrogen chloride removed by lead carbonate. I prefer lead carbonate because lead chloride which is formed is insoluble and can be removed easily. However, any other carbonate, bicarbonate, hydroxide or any other salt which binds the free acid and thus neutralizes the solution may be used instead. It is also possible to use anion exchange resin for this purpose.

The addition of ammonium carbonate which may be substituted by other soluble carbonates is to precipitate calcium or possible lead salts which stayed in solution and thus had been carried over. If this is omitted hydroxides or other basic salts of these metal ions may precipitate during the following passage through the exchange resin columns and may plug them. The final solution after concentration to a syrup, dilution with hot alcohol and addition of ether produces pure methyl α-L-fucoside in a yield of 40–50% of the total amount of L-fucose present. A second impure crystallizate increases the yield to about 60–65%.

A non-crystallizing syrup obtained by concentration of the filtrate may be used to obtain crystalline L-fucose as a by-product. For this purpose the syrup is refluxed in 1 N sulfuric acid and the acid afterwards is removed as barium sulfate. L-fucose is crystallized from methanol-ether in a yield of about 10% of the total fucose content.

If only L-fucose is desired hydrolysis of the filtrate with 1 N sulfuric acid may follow after passage through the exchange resin columns while the procedure up to that point is the same as described for preparing methyl α-L-fucoside, or other α-L-fucosides generally. The yield of L-fucose based on the total fucose content is then over 50%.

In order to illustrate how to carry out these reactions I will now give several examples.

*Example I.*—150 g. of unpurified fucoidan was suspended in 1000 cc. of methanol into which 56 g. of hydrogen chloride gas had been introduced. The mixture was placed in a pressure reaction apparatus and stirred at 110° for 6 hours. Then the heater was turned off while stirring was continued for 14 more hours. The temperature then had dropped to 46° C. An insoluble residue which weighed 59 g. was removed by filtration on a fritted glass funnel and washed with methanol. The dark brown filtrate was stirred with 410 g. of lead carbonate, filtered and concentrated to a syrup. After dilution with water and heating on a steam bath a solution of ammonium carbonate was added until the formation of a precipitate was completed. The mixture was filtered and then passed through anion and cation exchange resin columns until neutral. Most of the color was removed during treatment with exchange resins and with activated carbon, but the solution still was slightly yellow. It was concentrated in vacuo to a syrup which was diluted with methanol.

Ether was added and after seeding with methyl α-L-fucoside the solution was kept in the refrigerator for one day to complete crystallization. The crystals were removed, washed with a mixture of methanol-ether and dried: yield 10.5 g., M.P. 156–159° C. When mixed with authentic methyl α-L-fucoside the melting point was undepressed. After concentration of the filtrate, diluting with ethanol and ether and refrigeration 1.55 g. of a second crop of crystals with M.P. 152–156° was obtained. After concentration of the filtrate a syrup residue was left weighing 21 g.

In three additional experiments 150 g. of fucoidan was treated under the same conditions at temperatures of 80°, 60° and 20–25°. The solution after passage through the exchange resin columns and treatment with activated carbon were colorless. The weight of the insoluble residues was close to 60 g. in all experiments.

(a) The 80° sample produced 10.4 g. of methyl α-L-fucoside with M.P. 155–157°, 2.85 g. of a second crop with M.P. 147–155° and 2.75 g. of a third corp with M.P. 105–120°. The non-crystallizing residue weighed 21 g.

(b) In the 60° experiment 14 g. of methyl α-L-fucoside with M.P. 157–158° and 2.5 g. of a second crystallizate with M.P. 140–152° was obtained, the weight of the non-crystallizing syrup being 17.4 g.

(c) The experiment at room temperature produced methyl α-L-fucoside in a yield of 3.1 g. with M.P. 153–156°. No further crystals could be separated; the residue weighed 21 g.

*Example II.*—75 g. of fucoidan was suspended in 500 cc. of methanol containing 10 g. of hydrogen chloride and stirred by a magnetic stirrer for about 24 hours at 60°. As container a round bottom flask equipped with reflux condenser and a calcium chloride tube was used. The mixture then was filtered through a fritted glass funnel and the filtrate stirred with 73.2 g. of lead carbonate for 4 hours. The insoluble residue weighed 30 g. The lead salts were filtered off and the brown, neutral liquid was concentrated in vacuo to a syrup. The further treatment was the same as described above. The colorless, neutral solution finally obtained was concentrated to a syrup which was diluted with a mixture of methanol and ethanol. After addition of ether and one day of refrigeration 4.9 g. of methyl α-L-fucoside with M.P. 155–158° was obtained. A second crop with M.P. 106–119° weighed 2.8 g. and the non-crystallizing residue 4.5 g.

(a) In a second experiment 5 g. of hydrogen chloride was introduced while all other conditions were the same. The amount of lead carbonate used was 1 mole/1 mole HCl. The insoluble residue weighed 50.3 g. No crystals could be recovered; the non-crystallizing syrup weighed 1.4 g.

(b) When 20 g. of hydrogen chloride was used 7.2 g. of methyl α-L-fucoside with M.P. 148–155° and a second crop of 2.65 g. with M.P. 122–143° could be isolated while the residue weighed 4.3 g.

(c) Another experiment was conducted with using 42 g. of hydrogen chloride. 30 g. of an insoluble residue was obtained. Isolated were 7.1 g. of methyl α-L-fucoside with M.P. 147–156° and 1.7 g. of a second crop with M.P. 119–144°; the weight of the non-crystallizing syrup was 9.7 g.

*Example III.*—75 g. of unpurified fucoidan was stirred at 60° for 23 hours in 250 cc. of methanol containing 10 g. of HCl. The insoluble residue was removed weighing 32 g. and the filtrate was treated with lead carbonate as described above. Methyl α-L-fucoside with M.P. 154–158° was obtained in a yield of 5.6 g.; the second crystallizate of 1.1 g. had a M.P. of 143–155°; 8 g. of a non-crystallizing syrup was obtained as residue.

(a) A further experiment was conducted using 37.5 g. of fucoidan in 500 cc. of methanol containing 21 g. of HCl. The insoluble residue weighed 10.1 g. First and second crystallizates with yields of 3.85 g. and 1.75 g. had melting points of 153–156° and 103–134° respectively; 3.9 g. non-crystallizing residue was obtained.

(b) A third reaction was performed with 97.5 g. of fucoidan in 162.5 cc. of methanol containing 6.5 g. of hydrogen chloride. 79.5 g. of insoluble material was obtained after the reaction. The weight of the final syrup was a few grams only and no crystals could be obtained.

*Example IV.*—Fucoidan (120 grams), which was extracted for 40 hours with 90% methanol and which had 28.0% of L-fucose, was stirred at 70° with 1000 cc. of absolute ethanol containing 55 grams of hydrogen chloride for 23 hours. The residue was filtered off and discarded. The further procedure from there on was the same as described above. Eight grams of ethyl α-L-fucoside crystallized from a mixture of ethanol and ether; melting point 146–147°; $[\alpha]_D^{20}$ −182° (c. 1.5, water); second crop: 7.35 g., M.P. 139–143, $[\alpha]_D^{20}$ −176° (c. 1.5, water).

*Example V.*—The same reaction was carried out as in Example IV, but instead of ethanol, isopropyl alcohol was used. Isolated from an isopropyl alcohol-ether mixture was 11.8 grams of isopropyl α-L-fucoside; melting point 156°; $[\alpha]_D^{20}$ −189° (c. 1.5, water); second crop: 3.8 g., M.P. 151–153.5, $[\alpha]_D^{20}$ −183.3° (c. 1.5, water).

*Example VI.*—When using propylene glycol as the alcoholic reagent in Example IV, the end product was a colorless syrup which did not crystallize.

*Example VII.*—The same reaction as in Example IV was performed but cyclohexanol was used instead of isopropanol. The isolation and purification, however, were not carried out in aqueous solution but in 60% acetone. A light brown syrup was obtained as the final product. This syrup crystallized after a few days, was diluted with benzene, refrigerated, and then the crystals were removed by filtration, washed with benzene again and dried: yield 9.6 g., M.P. 146–147.5, $[\alpha]_D^{20}=-173.3$ (c., 1.5, water); after recrystallization from n-butanol: M.P. 148–148.5, $[\alpha]_D^{20}=-180.7$ (c. 1.5, water).

*Example VIII.*—40 g. of non-crystallizing residue obtained from different experiments using methanol, after removal of crystalline methyl α-L-fucoside, was diluted with 200 cc. of 1 N sulfuric acid and refluxed for 6 hours. Then it was treated with activated carbon and filtered. The sulfuric acid was then precipitated quantiatively as $BaSO_4$ with a solution of $Ba(OH)_2$. As soon as the solution became neutral the amount of $Ba(OH)_2$ usually was sufficient; any alkali medium was avoided. After treatment with some cation exchange resin of the polystyrene sulfonic acid type in its acid form, Amberlite IR-120-(H+), and activated carbon the colorless solution was concentrated in vacuo to a syrup which was diluted with hot methanol. Ether was added and after seeding with L-fucose the mixture was kept refrigerated for 8–12 days. Crystals occasionally were removed from the side of the flask with a spatula. The crystallizate was filtered off on a fritted glass funnel, washed with a cold mixture of methanol and ether and dried; yield 7.5 g., M.P. 136–138°, $[\alpha]_D^{20}=-75.50°\pm1.5°$ (c. 1.3, water). When admixed with an authentic sample of L-fucose the melting point was undepressed.

*Example IX.*—75 g. of fucoidan was subjected to methanolysis at 60° for 24 hours using 500 cc. of methanol and 25 g. of hydrogen chloride. The further procedure until after passage through cation and anion exchange resin columns was the same as described above. The neutral, colorless solution, however, then was concentrated to a smaller volume, acidified with sufficient sulfuric acid to make it 1 N with respect to the acid. After filtration, precipitation of the sulfuric acid as $BaSO_4$ and treatment with activated carbon and some Amberlite IR-120-(H+) the colorless solution was concentrated in vacuo to a syrup. The syrup was diluted with hot methanol to which ether was added. This mixture was left in the refrigerator for crystallization, occasionally removing the crystals from the side of the flask. After two weeks L-fucose was filtered off on a fritted glass funnel, washed with a mixture of methanol and ether and dried. The yield was 7.6 g., M.P. 136–139°, $[\alpha]_D^{20°} = -75.3° \pm 1.4°$ (c. 1.3, water). When mixed with authentic L-fucose the melting point was undepressed. The noncrystallizing syrup weighed 29.5 g.

Both types of the products obtainable in accordance with the present invention, namely, alkyl α-L-fucosides and L-fucose, have considerable utility. For example, they are useful per se in the medical field and as intermediates in the preparation of compounds for use in the medical field.

It will be appreciated that while my invention has been described and explained with the aid of and in terms of specific examples, numerous variations are possible in detail, including starting materials, conditions of reaction, and the like, all within the broad scope of the invention as defined by the claims which follow.

What I claim is:

1. The process of deriving useful products from fucoidan which comprises: forming a mixture of fucoidan, an alkyl alcohol and hydrogen chloride, sealing said mixture in a pressure vessel and heating it to a temperature of at least 50° C. for a period of time sufficient to permit substantial deploymerization of and removal of the sulfate groups from said fucoidan; and thereafter recovering from said mixture at least one of the class of fucoidan degradation products which consists of an alkyl α-L-fucoside and L-fucose.

2. The process of claim 1 in which said mixture subsequent to cooling and removal from said pressure vessel is treated with sufficient lead carbonate to neutralize said hydrogen chloride.

3. The process in accordance with claim 1 in which the said alkyl alcohol is methanol and in which the said mixture after cooling and removal from said pressure vessel is treated with sufficient lead carbonate to neutralize said hydrogen chloride, thereafter filtered, and the filtrate resulting therefrom thereafter concentrated by evaporation, treated with ether, and chilled so as to cause crystals of methyl α-L-fucoside to form.

4. The process of claim 1 in which the said alkyl alcohol is methanol and in which the said mixture after cooling and removal from said pressure vessel is treated with a neutralizing agent for said hydrogen chloride, is chilled so as to cause the precipitation of crystals of methyl α-L-fucoside therefrom; is filtered so as to remove said crystals; and is then subjected to sulfuric acid hydrolysis to promote the formation of L-fucose.

5. A method of preparing an alpha-L-fucoside comprising the steps of:
preparing a mixture including substantially pure fucoidan and an alcohol,
desulphating and depolymerizing said fucoidan relatively completely without at the same time decomposing the constituents of said mixture, and recovering said alpha-L-fucoside.

6. A method of preparing fucoidan degradation products consisting essentially in the steps of:
intermixing substantially pure fucoidan and a quantity of hydrogen chloride together with an alcohol, said alcohol being selected from the group consisting of methyl, ethyl, isopropyl, butyl, amyl, and cyclic alcohols, and said quantity consisting of at least 20 grams per liter alcohol,
sealing said mixture in a pressurized vessel and heating it to a temperature of well above 20° C. for a period of time sufficient to permit substantial depolymerization of, and removal of the sulphate groups in said fucoidan, and thereafter recovering from said mixture the corresponding alkyl-α-L-fucoside.

7. The process of claim 6 wherein said mixture, subsequent to cooling, is removed from said pressure vessel and is neutralized.

8. The process in accordance with claim 7 wherein subsequent to said neutralization the mixture is thereafter filtered and the filtrate resulting therefrom thereafter concentrated by evaporation, treated with ether and chilled so as to cause crystallization of a substantially pure α-L-fucoscide.

9. A method of preparing an L-fucose comprising the steps of:
intermixing substantially pure fucoidan and a quantity of hydrogen chloride together with an alcohol, said alcohol being selected from the group consisting of methyl, ethyl, isopropyl, butyl, amyl and cyclic alcohols, and said quantity consisting of at least 20 grams per liter of alcohol,
sealing said mixture in a pressurized vessel and heating it to a temperature of from about 50° to about 80° C. for a period of time sufficient to permit substantial depolymerization and removal of the sulphate groups in said fucoidan, and thereafter,
cooling said mixture, removing it from said pressure vessel and neutralizing it, then filtering said resultant mixture, thereafter concentrating the filtrate by evaporation, diluting the resulting syrup with water and subjecting this mixture to acid hydrolysis to derive L-fucose.

10. A method for preparing substantially pure crystals of an α-L-fucoside as well as substantially pure L-fucose comprising the steps of:
heating a mixture of substantially pure fucoidan, concentrated hydrogen chloride and methanol until the fucoidan is substantially depolymerized and desulphated without decomposing the constitutents thereof and,
thereafter recovering from said mixture the degradation product which consists of methyl α-L-fucoside and after subsequent hydrolysis, L-fucose.

References Cited by the Examiner
UNITED STATES PATENTS
2,390,507   1/1941   Cantor _____ 206—210

OTHER REFERENCES
Conchie et al.: J.C.S., 1950, pp. 827–832.

LEWIS GOTTS, *Primary Examiner.*